United States Patent
Petitjean et al.

(10) Patent No.: US 10,876,213 B2
(45) Date of Patent: Dec. 29, 2020

(54) WATER ELECTROLYSIS SYSTEM (SOEC) OR FUEL CELL (SOFC) OPERATING UNDER PRESSURE IN A TIGHT ENCLOSURE WITH IMPROVED REGULATION

(71) Applicant: COMMISSARIAT A L'ENERGIE ATOMIQUE ET AUX ENERGIES ALTERNATIVES, Paris (FR)

(72) Inventors: Marie Petitjean, Grenoble (FR); Andre Chatroux, Tullins (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 152 days.

(21) Appl. No.: 15/998,741

(22) PCT Filed: Feb. 15, 2017

(86) PCT No.: PCT/EP2017/053438
§ 371 (c)(1),
(2) Date: Aug. 16, 2018

(87) PCT Pub. No.: WO2017/140745
PCT Pub. Date: Aug. 24, 2017

(65) Prior Publication Data
US 2019/0093242 A1   Mar. 28, 2019

(30) Foreign Application Priority Data
Feb. 16, 2016   (FR) ..................... 16 51235

(51) Int. Cl.
*C25B 1/12* (2006.01)
*H01M 8/04089* (2016.01)
(Continued)

(52) U.S. Cl.
CPC .............. *C25B 1/12* (2013.01); *C25B 1/00* (2013.01); *C25B 9/20* (2013.01); *C25B 15/02* (2013.01);
(Continued)

(58) Field of Classification Search
CPC ........ C25B 15/02; C25B 1/12; H01M 8/2475; H01M 8/04104; H01M 8/04388; H01M 8/04395; H01M 8/4761
See application file for complete search history.

(56) References Cited

U.S. PATENT DOCUMENTS

| 6,689,499 B2 | 2/2004 | Gillett et al. |
| 7,985,507 B2 | 7/2011 | Kamihara |

(Continued)

FOREIGN PATENT DOCUMENTS

| FR | 1 559 504 | 3/1969 |
| FR | 2 957 361 A1 | 9/2011 |

(Continued)

OTHER PUBLICATIONS https://en.wikipedia.org/wiki/Compressor (Year: 2020).*
(Continued)

*Primary Examiner* — Nicholas A Smith
(74) *Attorney, Agent, or Firm* — Oblon, McClelland, Maier & Neustadt, L.L.P.

(57) ABSTRACT

A system for regulating the pressure of a high-temperature electrolysis or co-electrolysis (HTE) reactor or a fuel cell (SOFC) operating under pressure. The operation of the system includes: regulating the DH wet gas flow upstream of one of the chambers so as to ensure the electrochemical stability of the predetermined operating point; regulating the DO gas flow upstream of the at least one second chamber so as to ensure gas scavenging in the at least one second chamber, and in the enclosure; regulating the flow of second gas circulating in the enclosure, downstream of the enclosure, so as to ensure the detection of leaks and safety in relation thereto and to prevent the formation of an explosive atmosphere; and controlling the pressure, by means of the
(Continued)

regulation valves arranged downstream of the stack, on the gases, including the wet gas, which are also generally hot.

12 Claims, 4 Drawing Sheets

(51) Int. Cl.
| | |
|---|---|
| *H01M 8/04082* | (2016.01) |
| *C25B 9/20* | (2006.01) |
| *H01M 8/04746* | (2016.01) |
| *H01M 8/0438* | (2016.01) |
| *H01M 8/2475* | (2016.01) |
| *H01M 8/2425* | (2016.01) |
| *C25B 1/00* | (2006.01) |
| *C25B 15/02* | (2006.01) |
| *H01M 8/12* | (2016.01) |
| *H01M 8/124* | (2016.01) |

(52) U.S. Cl.
CPC ... *H01M 8/04089* (2013.01); *H01M 8/04104* (2013.01); *H01M 8/04201* (2013.01); *H01M 8/04388* (2013.01); *H01M 8/04395* (2013.01); *H01M 8/04753* (2013.01); *H01M 8/04761* (2013.01); *H01M 8/04776* (2013.01); *H01M 8/04783* (2013.01); *H01M 8/12* (2013.01); *H01M 8/2425* (2013.01); *H01M 8/2475* (2013.01); *H01M 2008/1293* (2013.01); *Y02E 60/36* (2013.01)

(56) References Cited

U.S. PATENT DOCUMENTS

| | | | |
|---|---|---|---|
| 9,957,626 B2 * | 5/2018 | Kawajiri | C25B 15/08 |
| 2002/0081471 A1 | 6/2002 | Keegan et al. | |
| 2017/0175277 A1 * | 6/2017 | von Olshausen | C25B 1/12 |
| 2018/0287172 A1 * | 10/2018 | Chatroux | C25B 1/10 |

FOREIGN PATENT DOCUMENTS

| | | |
|---|---|---|
| JP | 2010-146934 A | 7/2010 |
| WO | WO 2011/110676 A1 | 9/2011 |
| WO | WO 2012/008954 A1 | 1/2012 |
| WO | WO 2015/185039 A1 | 12/2015 |

OTHER PUBLICATIONS

Seidler, S., et al., "Pressurized solid oxide fuel cells: Experimental studies and modeling", Journal of Power Sources, vol. 196, 2011, pp. 7195-7202 (Year: 2011).*

International Search Report dated May 4, 2017 in PCT/EP2017/053438, 2 pages.

French Search Report dated Nov. 11, 2016 in French Patent Application No. 1651235 (with English translation of Category of Cited Documents), 3 pages.

Momma, A., et al., "Experimental Investigation of the Effect of Operating Pressure on the Performance of SOFC and SOEC", ECS Transactions, vol. 57 No. 1, 2013, pp. 699-708.

O'Brien, J.E., et al., "High Temperature Electrolysis Pressurized Experiment Design, Operation, and Results", Idaho National Laboratory, Sep. 2012, pp. 1-15 with cover pages.

Henke, M., et al., "A Validated multi-scale model of a SOFC stack at elevated pressure", Fuel Cells, No. 5, 2013, pp. 773-780.

Chang, H.W., et al., "An experimental investigation of pressurized planar solid oxide fuel cells using two different flow distributors", Journal of Power Sources, vol. 250, 2014, pp. 21-29.

Burke, A.A., et al., "Pressurized testing of a planar solid oxide fuol ocll stack", International Journal of Hydrogen Energy, vol. 38, 2013, pp. 13774-13780.

Jensen, S.H., et al., "Hydrogen and synthetic fuel production using pressurized solid oxide electrolysis cells", International Journal of Hydrogen Energy, vol. 35, 2010, pp. 9544-9549.

Seidler, S., et al., "Pressurized solid oxide fuel cells: Experimental studies and modeling", Journal of Power Sources, vol. 196, 2011, pp. 7195-7202.

* cited by examiner

US 10,876,213 B2

WATER ELECTROLYSIS SYSTEM (SOEC) OR FUEL CELL (SOFC) OPERATING UNDER PRESSURE IN A TIGHT ENCLOSURE WITH IMPROVED REGULATION

TECHNICAL FIELD

The present invention relates to the field of solid-oxide fuel-cell (SOFC) stacks and to the field of high-temperature electrolysis (HTE) of water (or HTSE, acronym for high-temperature steam electrolysis) in solid-oxide electrolysis cells (SOECs).

The invention more particularly relates to the regulation of the pressure of an HTE electrolyzer system or of an SOFC stack operating under pressure.

Although mainly described with reference to an application to high-temperature water electrolysis, the invention also applies to an SOFC stack.

PRIOR ART

The electrolysis of water is an electrolytic reaction that decomposes water into gaseous dioxygen and dihydrogen by means of an electrical current, according to the reaction:

$$H_2O \rightarrow H_2 + \tfrac{1}{2}O_2.$$

It is advantageous to carry out the electrolysis of water at high temperature, typically between 600 and 950° C., as some of the energy required for the reaction may be supplied by heat, which is less expensive than electricity, and activation of the reaction is more efficient at high temperature and does not require a catalyst.

As schematically shown in FIG. 1, a solid-oxide electrolysis cell 10 (SOEC) in particular comprises:
- a first porous conductive electrode 12, or "cathode", intended to be supplied with steam for the production of dihydrogen;
- a second porous conductive electrode 14, or "anode", via which the dioxygen ($O_2$) produced by the electrolysis of the water injected onto the cathode escapes; and
- a solid-oxide membrane (dense electrolyte) 16 sandwiched between the cathode 12 and the anode 14, the membrane 16 being anionically conductive at high temperatures, usually temperatures above 600° C.

By heating the cell 10 at least to this temperature and by injecting an electrical current I between the cathode 12 and the anode 14, water is reduced at the cathode 12, thereby generating dihydrogen ($H_2$) at the cathode 12 and dioxygen at the anode 14.

It is known to use an SOEC (acronym of "solid-oxide electrolysis cell") electrolyzer to implement high-temperature electrolysis, said electrolyzer consisting of a stack of elementary constituents that each include a solid-oxide electrolysis cell, which consists of three layers (anode/electrolyte/cathode) that are superposed on one another, and of interconnecting plates made of metal alloys, which plates are also referred to as bipolar plates or interconnectors. The function of the interconnectors is both to let electrical current pass and gases flow to each cell (injected steam and extracted hydrogen and oxygen in an HTE electrolyzer; injected air and hydrogen and extracted water in an SOFC stack) and to separate the anode and cathode compartments, which are the gas-flow compartments on the anode side and the cathode side of the cells, respectively. To carry out high-temperature electrolysis (HTE) of steam, steam ($H_2O$) is injected into the cathode compartment. Under the action of the current applied to the cell, dissociation of water molecules in steam form takes place at the interface between the hydrogen electrode (cathode) and the electrolyte: this dissociation produces dihydrogen gas ($H_2$) and oxygen ions. The dihydrogen is collected and exhausted at the outlet of the hydrogen compartment. The oxygen ions ($O^{2-}$) migrate through the electrolyte and recombine into dioxygen at the interface between the electrolyte and the oxygen electrode (anode).

A stack 20 of electrolysis cells that is intended to produce a large amount of hydrogen is illustrated in the schematic diagram of FIG. 2. In particular, the cells 10 are stacked on one another and are separated by interconnecting plates 18 that are connected to a supply 22 of steam with a view to injecting this steam onto the cathodes of the cells 10 at a steam flow rate 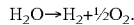 that is adjusted by a controllable valve 24. The plates 18 are also connected to a gas collector 26 for collecting the gases generated by the electrolysis.

An example of an interconnecting-plate structure and stack is for example described in patent application WO 2011/110676.

Such an electrolyzer may also operate in a co-electrolysis mode, i.e. a mode in which a gas mixture composed of steam ($H_2O$) and carbon dioxide ($CO_2$) is fed to the cathode compartment. The mixture output from the cathode compartment is then composed of hydrogen ($H_2$), steam ($H_2O$), carbon monoxide (CO) and carbon dioxide ($CO_2$).

To actually implement electrolysis with the stack 20, the stack is raised to a temperature above 600° C., usually a temperature comprised between 600° C. and 950° C., the supply of gas is started at constant flow rate and an electrical power supply 28 is connected across two terminals 30, 32 of the stack 20 in order to make a current I flow therethrough.

A high-temperature SOFC (solid-oxide fuel-cell) stack and an HTSE electrolyzer may have identical structures, only their operating mode being different. With reference to FIG. 3, a constituent electrochemical cell of an SOFC stack comprises the same elements, namely an anode 12, a cathode 14 and an electrolyte 16, as an electrolysis cell.

Considering one cell of the stack, dihydrogen or another fuel such as methane $CH_4$ is supplied, at constant flow rate, to its anode, and pure dioxygen, or dioxygen contained in air, is supplied, at constant flow rate, to its cathode, and the cell is connected to a load C in order to deliver the produced electrical current.

In a reactor stack such as described above the seal-tightness between the solid-oxide cells 10 and the interconnecting plates 18 is achieved via seals that form one of the weak points of the system.

Specifically, these seals, which are based on glass or glass-ceramic, and which ensure the seal-tightness of the stack with respect to the atmosphere, are fragile and are able to withstand only a slight positive pressure of about a few tens or a few hundred millibars.

Up to now, such systems have operated only at atmospheric pressure even if a few scientific studies have started to analyze operation under pressure.

The internal operation of an SOFC stack or of an HTE reactor under pressure, typically a few bars to a few tens of bars, typically 30 bars, thus requires a solution to prevent the loss of the seal-tightness of the seals.

A solution that consists in placing the HTE reactor stack or SOFC stack in a seal-tight enclosure that itself is pressurized is already known. Mention will be made here of publication [1] and of patent and patent applications FR 2957361A1, US2002/0081471 and U.S. Pat. No. 6,689,499 B2, which disclose this type of solution. This known solution has the advantage of making it possible to apply the same pressure inside and outside the stack. In other words, the pressures in the enclosure and in the chambers (compartments) of the stack are in equilibrium. This therefore allows the stack to be operated at a high pressure, of a few bars to a few tens of bars, without mechanically stressing the glass or glass-ceramic seals.

Thus, provided that the pressure of each anode or cathode chamber (compartment) of the stack is on the whole in equilibrium with the internal pressure of the enclosure, the seals are subjected only to a slight and typically almost zero differential pressure.

In electrolysis mode, the major drawback of such a solution is that it comes at the price of a loss of some hydrogen production as some of the hydrogen is burned in the enclosure. It is therefore not currently a solution that could be envisioned on an industrial scale, in electrolysis mode.

Certain high-temperature fuel-cell stacks are designed such that they are not seal-tight cathode side, this possibly simplifying operation under pressure since in this case the cathode is at the pressure of the enclosure.

In particular, the aforementioned patent U.S. Pat. No. 6,689,499 B2 implements this technique in fuel-cell mode, recombination of the gases output serving to heat the stack.

In electrolysis mode, one difficulty is also how to continuously and simultaneously obtain the same pressure (to within a few millibars) in the enclosure, in each anode chamber and in each cathode chamber, in order to best collect the produced gases.

In other words, it is necessary to regulate pressure with sufficient precision in the lines for supplying gases to and for collecting gases from the stack to meet the constraint of low differential pressures on the seals.

However, another difficulty is due to the fact that the gas flowing through the cathode chambers contains a lot of steam, which may condense during its expansion to atmospheric pressure.

Up to now, experts in thermodynamics have recommended regulating pressure on dry gases. This is therefore generally what is done.

Mention may be made here of the studies discussed in publications [2] to [6]. In most of these studies, the trials relate to SOFC stacks in which the gas is dry or contains very little moisture, or else to SOEC electrolyzer systems in which the gases are dried in a condenser installed inside the pressurized enclosure. In addition, in most cases, only an operating point at 3 bars or at 5 bars is possible.

In the neighboring field of proton-exchange-membrane (PEM) fuel-cell stacks, the stresses on the seals and the pressures between the chambers are completely different since the membrane is able to withstand a differential pressure of several bars. However, patent application WO 2012/008954 A1, which relates to the regulation of the pressure of a wet gas by virtue of a negative pressure provided by a pump, and patent U.S. Pat. No. 7,985,507 B2, which discloses regulation by means of an on/off valve, should be noted. The solutions disclosed in this patent application and in this patent are however not applicable to solid-oxide systems in which the constraints are much more severe.

Another difficulty with the solution consisting in placing an HTE electrolyzer or an SOFC stack inside a pressurized enclosure is related to the fact that the stack comprises (anode and cathode) gas-flow chambers that intrinsically have a small volume with respect to that of the enclosure. Pressure regulation is in this case difficult because variations in pressure inside the enclosure may be very slow with respect to those inside the chambers of the stack.

Thus, in case of a rapid increase in pressure in any one of the chambers of the stack, it will be very difficult to increase the pressure in the enclosure as rapidly. To remove this constraint, the study [7] proposes to implement a buffer volume at the outlet of each gas-flow line of the stack so as to achieve three identical volumes of gas, i.e. a volume comprising the anode chambers and a first buffer volume, a volume comprising the cathode chambers and a second buffer volume, and the volume bounded by the enclosure. Thus, by making provision for three identical volumes, it is possible to use the same on/off valves to regulate the pressure of the enclosure and the pressure inside the chambers of the stack. This solution is constraining because it corresponds to multiplication of the volume of the pressurized enclosure by a factor of 3, and therefore the cost of the system is much higher. These buffer volumes are also penalizing in a reversible operating mode because they penalize the time taken to switch from one mode to the other since it is necessary to purge them with inert gas each time.

In other words, in the prior art relating to high-temperature electrolyzers and fuel-cell stacks there is no system that provides a satisfactory solution to the regulation of the pressure of a wet gas in an operating range from atmospheric pressure to a few tens of bars.

The patent application filed under the number FR 1559504 on Oct. 6, 2015 in the name of the applicant discloses a system that provides a satisfactory solution to the regulation of the pressure of a wet gas in an operating range from atmospheric pressure to a few tens of bars. However, this solution is one that was established and demonstrated for a specific experimental apparatus of small size, one of the risks of which was leakage from the metal seal of the pressurized enclosure. Thus, although satisfactory and operational in a good number of configurations, this solution would require many measurements and regulations to be carried out if it were to be applied to the penalizing case in which the pressurized enclosure may have or is judged to have a relatively high risk of leakage to the outside.

This being so, many industrial configurations in which seal-tightness, or at the very least a low risk of leakage, can be guaranteed, need to be addressed.

There is therefore a need to improve the regulating systems of electrolyzers or fuel-cell stacks operating under pressure in an enclosure for which it is possible to guarantee seal-tightness or, at the very least, a low risk of leakage, in particular in order to make redundant at least some of the many measurements and regulations required to implement the solution according to the aforementioned patent application FR1559504.

The aim of the invention is to at least partially meet this need.

SUMMARY OF THE INVENTION

To this end, the invention relates to a system including:
- at least one first chamber through which a first gas, which is a gas that is potentially wet, is able to flow;
- at least one first supply line that is able to supply the inlet of the first chamber with potentially wet gas up to a maximum operating pressure $P_{max}$, the first supply line comprising a first flow-rate regulator that is able to regulate the flow rate $D_H$ of the first gas between a zero value and a maximum value $D_{H,max}$;
- at least one second chamber through which a second gas, preferably air, is able to flow;

a seal-tight enclosure in which the first and second chambers are housed, and through which the same second gas is able to flow, the enclosure being able to operate under the pressure of the second gas up to the maximum operating pressure $P_{max}$;

at least one second supply line that is able to supply the inlet of the second chamber and the seal-tight enclosure with the second gas, the second supply line comprising a second flow-rate regulator that is able to regulate the flow rate $D_O$ of the second gas between a zero value and a maximum value $D_{O,max}$;

at least one outlet line that is able to exhaust the second gas from inside the seal-tight enclosure, said outlet line comprising a third flow-rate regulator that is able to regulate the flow rate $D_{purge}$ of the second gas between a zero value and a maximum value $D_{purge,max}$;

pressure sensors ($P_H$, $P_O$) that are able to measure the pressure in each of the first and second chambers, between atmospheric pressure and the value of the maximum pressure $P_{max}$;

at least two regulating valves ($V_H$, $V_O$) that are arranged outside the enclosure and on the outlet lines of the one or more first chambers and of the one or more second chambers, respectively, each valve being able to operate at a temperature above the condensation temperature of the wet gas at the maximum pressure $P_{max}$ in question, each valve being able to be open from 0% to 100% and having a capacity $K_v$ suitable for the maximum pressure $P_{max}$ and for the average flow rate of the gas in question in each of the two outlet lines;

means for heating the lines containing the wet gas to a temperature above the condensation temperature of this wet gas at the maximum pressure $P_{max}$ in question; and commanding and automatically controlling means for commanding and automatically controlling the regulating valves ($V_H$, $V_O$) depending on differences in pressure values measured by the pressure sensors so as to obtain a minimum pressure difference between the one or more first chambers and the one or more second chambers.

By "potentially wet gas", what is meant here and in the context of the invention is a gas the state of which may already be wet on entry into the system according to the invention or that may pass to a wet state during its generation in or its passage through the system.

By "seal-tight enclosure", what is meant here and in the context of the invention is an enclosure that has a low, or even very low leakage rate of pressurized gas from the inside of the enclosure. Typically, the enclosure may have a leakage rate lower than $\frac{1}{1000}^{th}$ of $D_O$.

According to one variant, the system according to the invention comprises a condenser for condensing the wet gas, said condenser being arranged downstream of the regulating valve $V_H$ on the outlet line of the one or more first chambers. Thus, the system does not necessarily comprise any condenser. Specifically, in certain applications, the wet gas exiting the system may be used as such without it being necessary to condense it. This may be the case if the wet gas must be supplied to a certain type of reactor or reservoir, for example a methanizer, etc.

According to one advantageous embodiment, the commanding and automatically controlling means furthermore are able to command and automatically control the regulators regulating the flow rate $D_O$ of the second gas depending on the state of openness of the valves $V_O$. for regulating the second gas, in order to prevent states of complete openness or closedness of the valves $V_O$ for the second gas.

According to one advantageous application, the system comprises a high-temperature electrolysis or co-electrolysis (HTE) reactor comprising a stack of elementary solid-oxide (co-)electrolysis cells each comprising an anode, a cathode, and an electrolyte inserted between the anode and the cathode, the cells being electrically connected in series, the stack comprising two electrical terminals for the supply of current to the cells and defining flow chambers for, with respect to the first chambers, the flow of steam and hydrogen or of steam, hydrogen and carbon dioxide ($CO_2$) over the cathodes and flow chambers for, with respect to the second chambers, the flow of air or nitrogen or oxygen or of a mixture of gases containing oxygen over the anodes.

According to another advantageous application, the system comprises a high-temperature fuel-cell (SOFC) stack comprising a stack of elementary solid-oxide electrochemical cells each comprising an anode, a cathode, and an electrolyte inserted between the anode and the cathode, the cells being electrically connected in series, the stack comprising two electrical terminals for the collection of current from the cells and defining flow chambers for, with respect to the first chambers, the flow of dihydrogen or another fuel gas or of a mixture containing a fuel gas over the anodes and flow chambers for, with respect to the second chambers, the flow of air or nitrogen or oxygen or of a mixture of gases containing oxygen over the cathodes. In this case, the gas entering into the first chamber is not necessarily wet, but, in contrast, it is wet on exiting because steam is a product of the electrochemical reaction in this first chamber.

The system may be reversible, the fuel-cell stack possibly being a high-temperature electrolyzer and vice versa.

The invention applies to "average temperature" electrolyzers or fuel-cell stacks, i.e. electrolyzers or fuel-cell stacks that operate at 400° C., or even to proton ceramic fuel-cell (PCFC) stacks.

Generally, outside of the technical field of solid-oxide electrochemical systems, the invention applies to any system in which there is a need to regulate the pressure of a plurality of seal-tight chambers housed in a main enclosure and through each of which a pressurized gas must flow.

According to one variant of the invention, the system may comprise at least two absolute pressure sensors ($P_H$, $P_O$) that are each able to measure the pressure in each of the first chambers and in each of the second chambers, respectively.

Alternatively, the system may comprise one or more absolute pressure sensors $P_H$ that are each able to measure the pressure in each of the first chambers, and comprising at least one differential pressure sensor that is able to measure the pressure difference $\Delta P_O=(P_O-P_H)$ between the one or more second chambers and the one or more first chambers, respectively.

According to another variant of the invention, the system may furthermore comprise bypass valves $V_{H,bypass}$, $V_{O,bypass}$ that are each arranged in parallel with the regulating valves $V_H$, $V_O$, respectively. These bypass valves allow operation at atmospheric pressure when they are opened. To this end, these bypass valves have a passage diameter of the same order of magnitude as that of the gas-flow lines so as to decrease head loss in their passages.

Thus, the invention essentially consists in:
regulating, upstream of one of the chambers, the flow rate $D_H$ of wet gas so as to guarantee the electrochemical stability of the preset operating point;
regulating, upstream of the one or more second chambers, the gas flow rate $D_O$ so as to guarantee purge gas is flushing the one or more second chambers and the enclosure;

regulating, downstream of the enclosure, the flow rate $D_{purge}$ of the second gas flowing through the enclosure in order to ensure detection of and safety with respect to leakage and to avoid the formation of an explosive atmosphere; and controlling the pressure by virtue of the regulating valves $V_H$, $V_O$ that are arranged downstream of the stack, the gases regulated by the valves including the wet gas, these gases furthermore generally being hot.

During the operation of the system, gases will be expanded in the regulating valves and will therefore cool.

Thus, the solution according to the invention goes against the prejudices of specialists in thermodynamics who would avoid such cooling because they would consider that it could lead to the formation of droplets of liquid water that might block the orifice of the valve.

To avoid this, specialists in thermodynamics rather propose to dry the gases before they reach the regulating valves.

However, the inventors consider, from their experience, that the solution according to the invention, which consists in carrying out a regulation on wet gas, works very well provided that the lines containing the steam are kept at a temperature above the condensation temperature of steam at the maximum pressure $P_{max}$ in question.

A regulation on wet gas even has the advantage, for solid-oxide systems such as an HTE reactor or SOFC stack, of participating, by virtue of this expansion, in the cooling of the gas before it is sent to the condenser in which it will be cooled in order to remove most of the steam.

So as to obtain pressure changes of the same order of magnitude in each of the three compartments, namely the one or more first chambers, the one or more second chambers, and the enclosure, it is recommended to preferably have the same ratio between the volume of the compartment in question and the maximum flow rate of gas that may be injected into said compartment.

Including therein the volume of the gas-flow lines upstream and downstream of the enclosure and of the chambers, if $Vol_H$ is the volume of the one or more first chambers and $Vol_O$ the volume of the one or more second chambers and of the enclosure, the gas flowmeters are preferably dimensioned to respect the ratio:

$$\frac{Vol_H}{D_{H,max}} = \frac{Vol_O}{D_{O,max}}$$

The invention also relates to a method for operating the system that has just been described, comprising the following steps:

a/ defining the following operating setpoints:
a1/ defining a flow rate $D_H$ that corresponds to the amount of potentially wet gas required for a preset electrochemical operating point;
a2/ defining a flow rate $D_O$ that corresponds to the amount of second gas required for a preset electrochemical operating point and to purge the seal-tight enclosure;
a3/ defining a flow rate $D_{setpoint}$ that corresponds to the amount of second gas required to ensure detection of and safety with respect to leaks and to avoid the formation of an explosive atmosphere in the enclosure;
a4/ defining a pressure $P_{setpoint}$ for the preset operating point;
a5/ defining the differential pressure $\Delta P_{O,setpoint}$ corresponding to the pressure difference between the pressure in the one or more second chambers, and the pressure in the one or more first chambers;

b/ applying the following regulations:
b1/ actuating the (or the more than one) regulator(s) for regulating the flow rate of wet gas, in order to regulate the flow rate $D_H$ of the wet gas;
b2/ actuating the (or the more than one) regulator(s) for regulating the flow rate of second gas, in order to regulate the flow rate $D_O$ entering into the one or more second chambers;
b3/ actuating the (or the more than one) regulator(s) for regulating the flow rate of purge gas, in order to regulate the flow rate $D_{purge}$ exiting from the enclosure;
b4/ actuating the valve $V_H$ for regulating the wet gas in order to regulate the actual pressure $P_H$ of the one or more first chambers to the setpoint value $P_{setpoint}$; and
b5/ actuating the valve $V_O$ of the second gas so that the actual differential pressure $\Delta P_O = (P_O - P_H)$ between the one or more second chambers and the one or more first chambers is regulated depending on the measured error ($\Delta P_{O,setpoint} - \Delta P_O$) with respect to the setpoint, so that the pressure $P_O$ of the second gas follows that $P_H$ of the one or more first chambers with the setpoint differential pressure $\Delta P_{O,setpoint}$.

According to one variant of the method, provision is furthermore made for a step of increasing the flow rate $D_O$ of the second gas if the valve $V_O$ for regulating the second gas is close to a state of complete closedness.

Conversely, provision may be made for a step of decreasing the flow rate $D_O$ of the second gas if the valve $V_O$ for regulating the second gas is close to a state of complete openness.

In other words, in addition to the regulations of steps b1/ to b5/, provision may be made to increase or decrease the flow rates $D_O$, preferably via automatic control, when the valves $V_O$ regulating the second gas risk reaching their limits of closedness or openness. Thus:
if $V_O$ risks closing, then the flow rate $D_O$ is increased; and
if $V_O$ risks opening 100%, then the flow rate $D_O$ is decreased.

In the phase of rising pressure, the valve $V_H$ for regulating the potentially wet gas may close completely. In this case, when the system is a solid-oxide electrochemical system, care is taken to implement safety measures to interrupt the production of gas or maintain the flow rate of the gas at a minimum value.

In particular, when the system comprises a (co-)electrolysis reactor, on complete closure of the valve $V_H$ for regulating the wet gas (steam and produced hydrogen), there is practically no longer any flow of reagent gases to the electrolysis cells, and it is therefore recommended to implement a safety measure to stop the production of hydrogen by setting the electric-current setpoint to zero.

Likewise, in SOFC-stack mode it may be necessary to maintain an oxygen flow rate in order to supply the cells with oxidant. This allows a minimum value to be defined for the oxygen flow rate $D_O$, below which value the flow-rate regulator will not be able to drop. Another possibility consists in implementing a security measure to stop the production of electricity by setting the electric-current setpoint to zero.

DETAILED DESCRIPTION

Other advantages and features of the invention will become more clearly apparent on reading the detailed description of examples of implementation of the invention, given by way of non-limiting illustration with reference to the following figures, in which.

Figure 1:
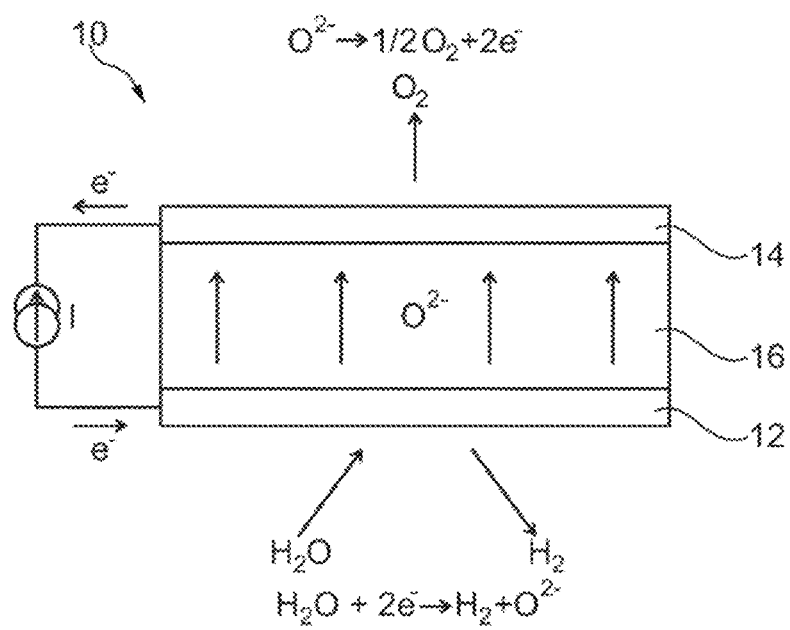
FIG. 1 is a schematic view of an elementary electrochemical cell of an HTSE electrolyzer.
Figure 2:
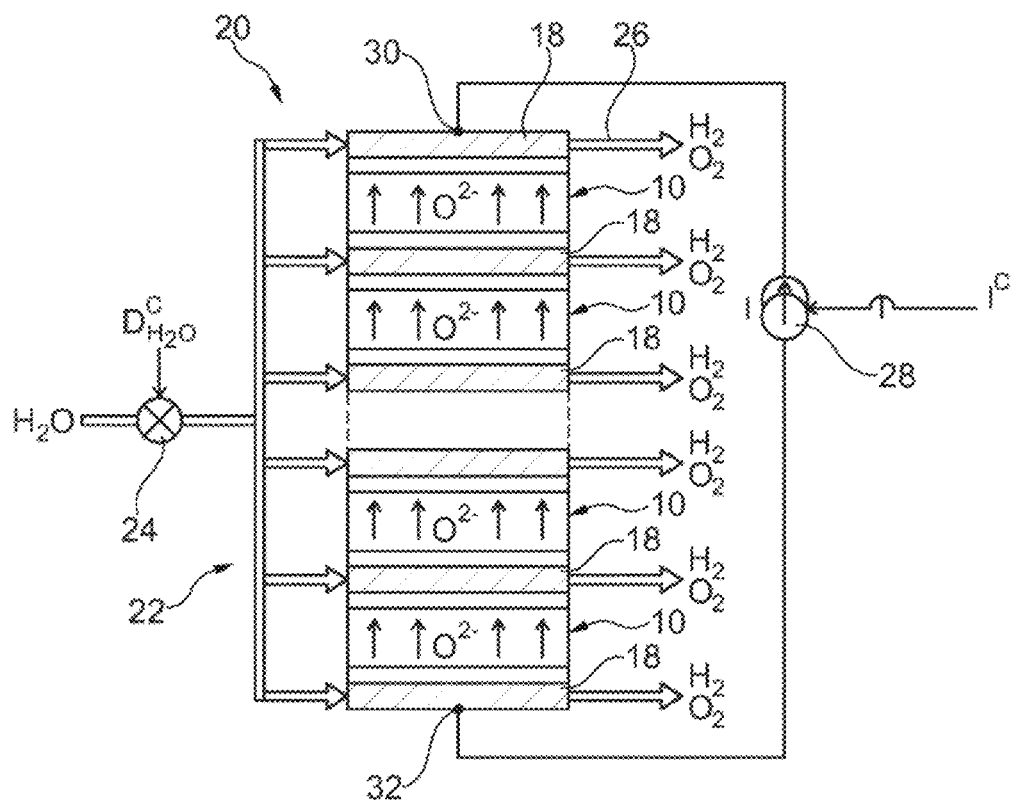
FIG. 2 is a schematic view of a stack of cells according to FIG. 1.
Figure 3:
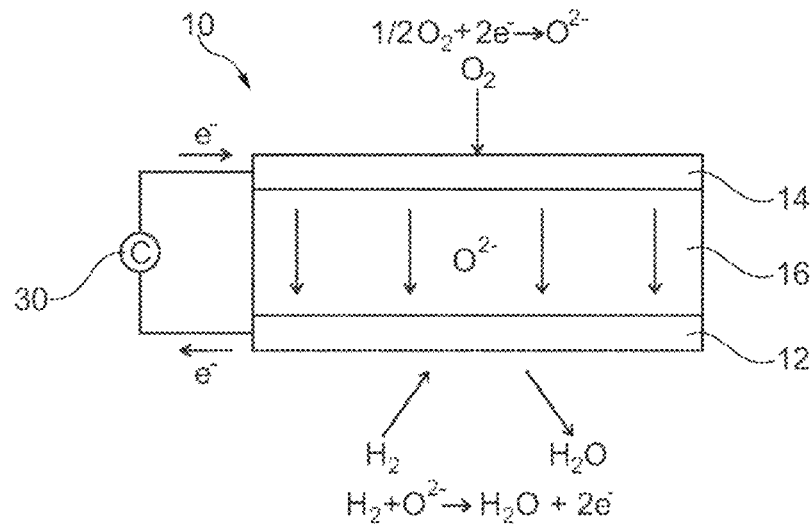
FIG. 3 is a schematic view of an electrochemical cell of an SOFC stack.

FIGS. 1 to 3, which relate to the prior art, have already been commented on in the preamble. They are therefore not described below.

For the sake of clarity, the same elements of an HTE reactor according to the prior art and of an HTE reactor used as a component in a system according to the invention have been referenced with the same reference numbers.

It will be noted here that throughout the present patent application, the terms "bottom", "top", "above", "below", "inside", "outside", "internal" and "external" are to be understood with reference to an interconnector according to the invention seen in transverse cross section along its axis of symmetry.

It will also be noted that the terms "upstream", "downstream", "inlet" and "outlet" are to be considered with respect to the flow direction of the gases.

It will also be noted that the electrolyzer or fuel-cell modules described are solid-oxide-electrolysis-cell (SOEC) electrolyzer modules or solid-oxide-fuel-cell (SOFC) modules that operate at high temperature.

Thus, all the constituents (anode/electrolyte/cathode) of an electrolysis or fuel-cell-stack cell are ceramics. The high operating temperature of an electrolyzer (electrolysis reactor) or of a fuel-cell stack is typically between 600° C. and 950° C.

Typically, the characteristics of an elementary SOEC suitable for the invention, of the cathode-supported type (CSC), may be those indicated as follows in the table below.

TABLE

| Electrolysis cell | Unit | Value |
|---|---|---|
| Cathode 2 | | |
| Material from which it is made | | Ni-YSZ |
| Thickness | μm | 315 |
| Thermal conductivity | W m⁻¹ K⁻¹ | 13.1 |
| Electrical conductivity | Ω⁻¹ m⁻¹ | 10⁵ |
| Porosity | | 0.37 |
| Permeability | m² | 10⁻¹³ |
| Tortuosity | | 4 |
| Current density | A · m⁻² | 5300 |
| Anode 4 | | |
| Material from which it is made | | LSM |

TABLE-continued

| Electrolysis cell | Unit | Value |
|---|---|---|
| Thickness | μm | 20 |
| Thermal conductivity | W m⁻¹ K⁻¹ | 9.6 |
| Electrical conductivity | Ω⁻¹ m⁻¹ | 1 × 10⁴ |
| Porosity | | 0.37 |
| Permeability | m² | 10⁻¹³ |
| Tortuosity | | 4 |
| Current density | A · m⁻² | 2000 |
| Electrolyte 3 | | |
| Material from which it is made | | YSZ |
| Thickness | μm | |
| Resistivity | Ω m | 0.42 |

Figure 4:
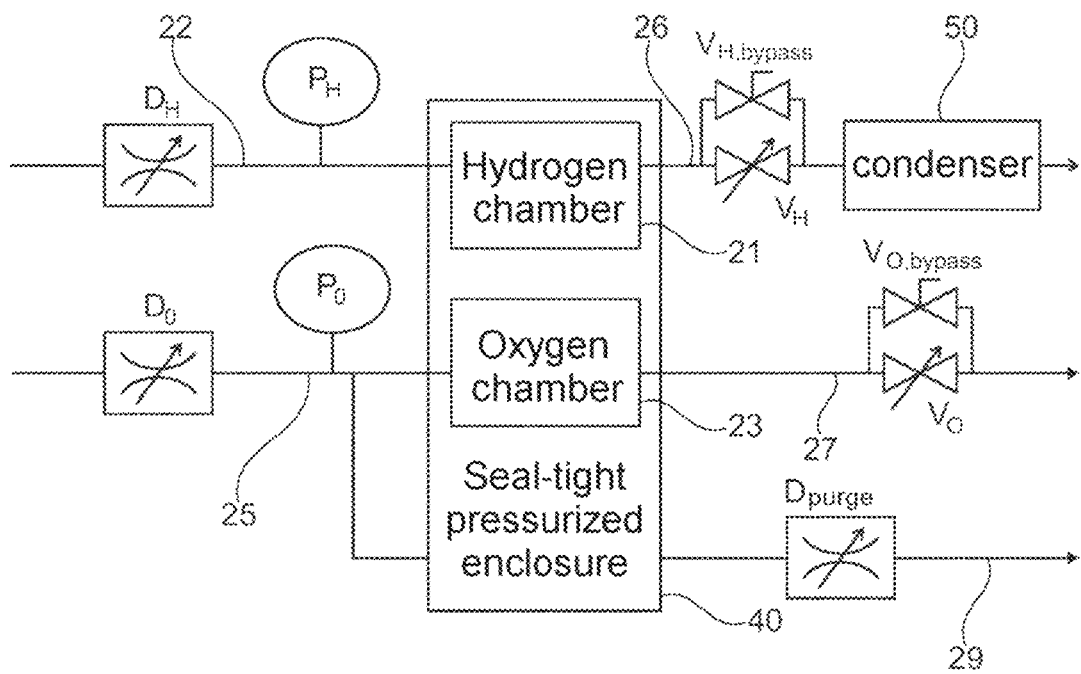
FIG. 4 is a schematic view of a system according to the invention comprising an HTE electrolyzer, the figure showing the flow-rate regulators and sensors required to regulate pressure in the flow chambers for steam and hydrogen and for oxygen and in the pressurized seal-tight enclosure that houses the chambers.

With reference to FIG. 4, the pressure of the system according to the invention is regulated from atmospheric pressure to a chosen pressure of about 30 bars.

The system firstly comprises a high-temperature co-electrolysis or electrolysis (HTE) reactor comprising a stack 20 of elementary solid-oxide (co-)electrolysis cells each comprising an anode, a cathode, and an electrolyte inserted between the anode and the cathode, the cells being electrically connected in series, the stack comprising two electrical terminals for the supply of current to the cells and defining flow chambers 21 for the flow of steam and hydrogen or of steam, hydrogen and carbon dioxide ($CO_2$) over the cathodes and flow chambers 23 for the flow of air or nitrogen or oxygen or of a mixture of gases containing oxygen over the anodes.

The system furthermore comprises:
a supply line 22 that is able to supply the inlet of the chambers 21 with steam up to a maximum operating pressure $P_{max}$, on which supply line a flow-rate regulator that is able to regulate the flow rate $D_H$ of steam and produced hydrogen between a zero value and a maximum value $D_{H,max}$ is arranged;
an enclosure 40 in which the stack 20 with its chambers 21, 23 is housed, through which air, by way of purge gas, is able to flow, the enclosure being able to operate under pressure up to the maximum operating pressure $P_{max}$;
a supply line 25 that is able to supply the inlet of the chambers 23 and the pressurized seal-tight enclosure 40 with air, on which supply line a flow-rate regulator that is able to regulate the flow rate $D_O$ of air between a zero value and a maximum value $D_{O,max}$ is arranged;
an outlet line 29 that is able to make a flow of purging air flow into the inside of the enclosure, on which supply line a flow-rate regulator that is able to regulate the flow rate $D_{purge}$ of air between a zero value and a maximum value $D_{purge\_max}$ is arranged;
pressure sensors $P_H$, $P_O$ that are able to measure the pressure in the chambers 21, 23, between atmospheric pressure and the value of the maximum pressure $P_{max}$;
at least two regulating valves $V_H$, $V_O$ that are arranged outside the enclosure 40 and on the outlet lines of the chambers 21 and of the chambers 23 respectively, each valve being able to operate at a temperature above the condensation temperature of the wet gas at the maximum pressure $P_{max}$ in question, each valve being able to be open from 0% to 100% and having a capacity $K_v$ suitable for the maximum pressure $P_{max}$ and for the average flow rate of the gas in question in each of the two outlet lines;

at least two bypass valves $V_{H,bypass}$, $V_{O,bypass}$ that are each arranged in parallel with the regulating valves $V_H$, $V_O$, respectively;

means for heating the lines of the steam and produced hydrogen to a temperature above the condensation temperature of this wet gas at the maximum pressure $P_{max}$ in question;

a condenser 50 that is arranged downstream of the regulating valve $V_H$ on the outlet line of the chambers 21; and commanding and automatically controlling means for commanding and automatically controlling the regulating valves ($V_H$, $V_O$) depending on differences in pressure values measured by the pressure sensors so as to obtain a minimum pressure difference between the chambers 21, 23.

The commanding and automatically controlling means in particular comprise a microprocessor and proportional-integral-derivative (PID) regulators.

The means for heating the various wet-gas lines are in particular temperature-regulated heating wires.

Figure 5:
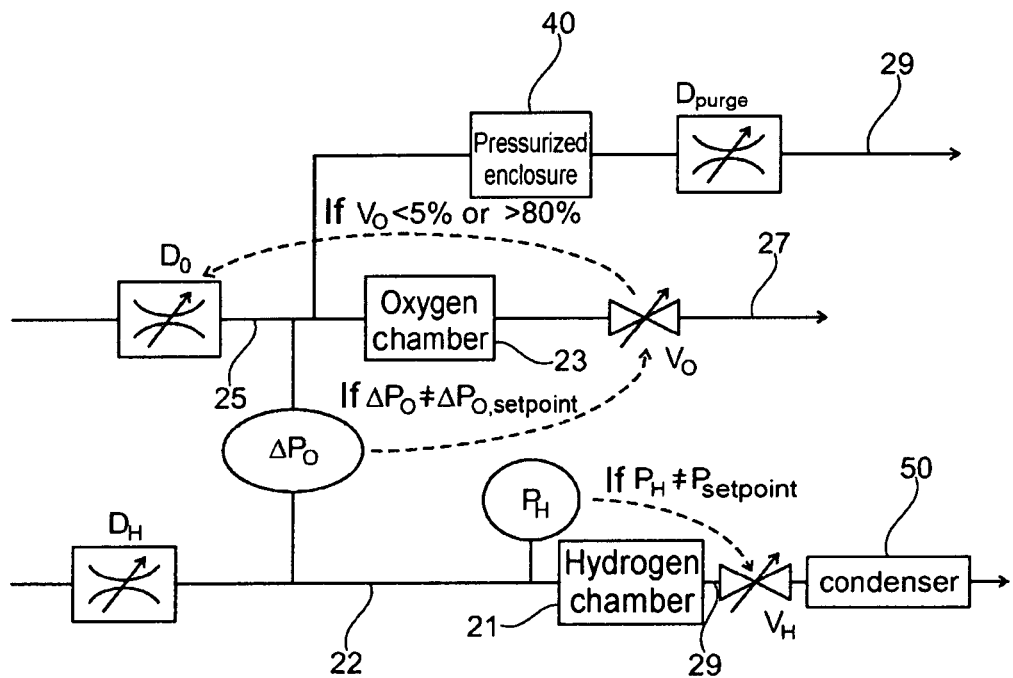
FIG. 5 is a schematic view of the flow-rate regulators and sensors with the automatic-control loops used to control the system according to FIG. 4 shown.

Reference is now made to FIG. 5, which illustrates an example of regulating loops implemented automatically by a system according to the invention.

Beforehand, an operator responsible for operating the system defines operating setpoints.

The regulating loops according to the invention consist in succession in:

regulating, upstream of the stack 20, the flow rate $D_H$ of gas consisting of a mixture of steam and hydrogen, which flow rate is defined by the operator so as to guarantee the stability of the operating point of the solid-oxide cells;

regulating, upstream of the stack 20, the flow rate $D_O$ of air, which flow rate is defined by the operator so as to guarantee the stability of the operating point of the solid-oxide cells;

regulating, downstream of the enclosure 40, the flow rate $D_{purge}$ of air, which flow rate is defined by the operator so as to guarantee the safety of the system;

regulating to an operator setpoint $P_{setpoint}$ the pressure of the hydrogen chambers 21 by virtue of the regulating valve $V_O$ downstream of the stack 20;

regulating to an operator setpoint $\Delta P_{O,setpoint}$ the pressure difference $\Delta P_O = (P_O - P_H)$ between the oxygen chambers 23 and hydrogen chambers 21 by virtue of the regulating valve $V_O$ placed downstream of the stack 20;

periodically adjusting, in steps of 10%, the oxygen flow rate $D_O$ if the valve $V_O$ closes to less than 5% or opens to more than 80%.

By way of example, the setpoints defined by the operator may be the following:

hydrogen/steam flow rate $D_H$ in the range from 0 to 10 l/h;
air flow rate $D_O$ in the range from 0 to 100 l/h;
air flow rate $D_{purge}$ in the range from 0 to 90 l/h;
$P_{setpoint}$ in the range from atmospheric pressure to 30 bars; and
$\Delta P_{O,setpoint}$ in the range from −100 to 100 mbar and preferably 50 mbar.

Figure 6:
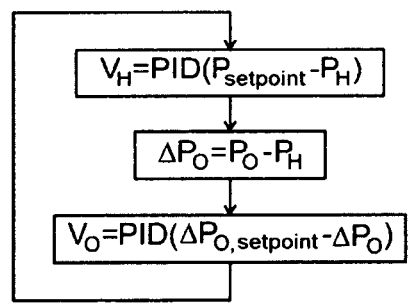
FIG. 6 is a computational flowchart of the pressure regulations according to the embodiment of FIG. 4.

FIG. 6 gives the order of and details on the regulations of the valves $V_O$, $V_H$ implemented by the PID modules:

the regulating valve $V_H$ is automatically controlled with respect to the difference ($P_{setpoint} - P_H$);
the differential pressure $\Delta P_O = (P_O - P_H)$ is calculated; and the regulating valve $V_O$ is automatically controlled with respect to the difference ($\Delta P_O - \Delta P_{O,setpoint}$).

Figure 7:
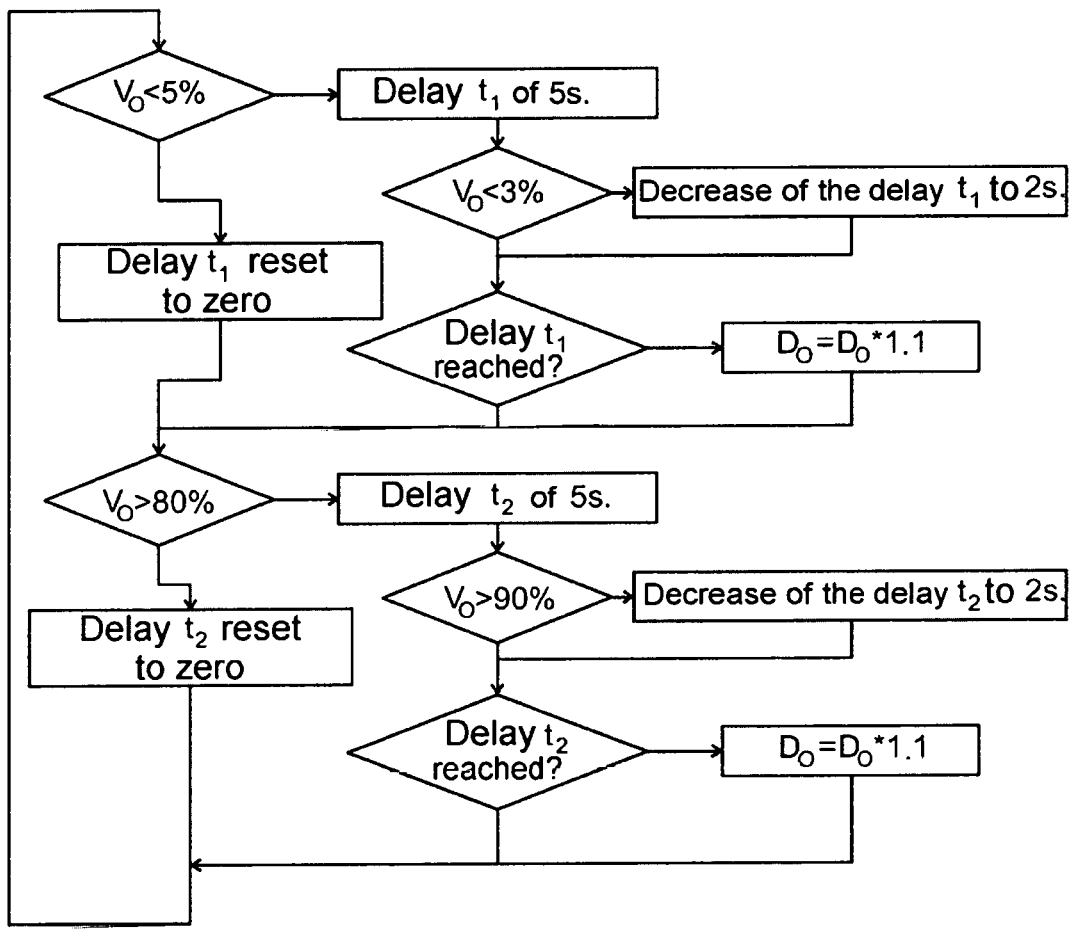
FIG. 7 is a computational flowchart of the regulation according to the invention of the flow rate $D_O$ of the oxygen-flow chambers depending on the percentage of openness of the valve $V_O$ in a high-temperature electrolysis module with a seal-tight enclosure.

FIG. 7 provides numerical values corresponding to the implementation of the invention in a seal-tight enclosure.

More precisely, FIG. 7 gives details on the loop for regulating the oxygen flow rate $D_O$ depending on the state of openness of the regulating valve $V_O$:

if $V_O < 5\%$ for 5 seconds, then $D_O$ is increased by 10%;
if $V_O < 3\%$ for 2 seconds, then $D_O$ is increased by 10%;
if $V_O > 80\%$ for 5 seconds, then $D_O$ is decreased by 10%;
if $V_O > 90\%$ for 2 seconds, then $D_O$ is decreased by 10%.

Other variants and advantages of the invention may be applied without departing from the scope of the invention.

The invention is not limited to the aforementioned examples; in particular, features of the illustrated examples may be combined in variants that have not been illustrated.

CITED REFERENCES

[1]: "*Experimental investigation of the effect of operating pressure on the performance of SOFC and SOEC*", A. Momma, K. Takano, Y. Takana, T. Kato, A. Yamamoto,

[2]: "*High temperature pressurized experiment design, operation and result*", J. E. O'Brien, X. Zhang, G. K. Housley, K. DeWall, L. Moore-McAteer, G. Tao, DOI 10.1002/fuce 201300076,

[3]: "*A validated multi-scale model of a SOFC stack at elevated pressure*", M. Henke, C. Willich, C. Westner, F. Leucht, J. Kallo, W. G. Bessler and K. A. Friedrich, Journal of Power Sources, 196(2011) 7195-7202,

[4]: "*An experimental investigation of pressurized planar solid oxide fuel cells using two different flow distributors*", H. W. Chang, C. M. Huang, S. S. Shy, International Journal of Hydrogen Energy, vol. 38 (2013), 13774-13780,

[5]: "*Pressurized testing of a planar solid oxide fuel cell stack*", A. A. Burke, L. G. Carreiro, J. R. Izzo Jr., International Journal of Hydrogen Energy, vol. 35 (2010), 9544-9549,

[6]: "*Hydrogen and synthetic fuel production using pressurized solid oxide electrolysis cells*", S. Højgaard Jensen, X. Sun, S. Dalgaard Ebbesen, R. Knibbe, M. Mogensen, ECS Transactions, 57 (1) 699-708 (2013),

[7]: "*Pressurized solid oxide fuel cells: Experimental studies and modeling*", S. Seidler, M. Henkea, J. Kalloa, W. G. Besslera, U. Maierb, A. Friedrich, Journal of Power Sources, 250(2014) 21-29.

The invention claimed is:

1. A system, comprising:

at least one first chamber through which a first gas, which is a gas that is potentially wet, is able to flow;

at least one first supply line that is able to supply an inlet of the first chamber with potentially wet gas up to a maximum operating pressure $P_{max}$, the first supply line comprising a first flow-rate regulator that is able to regulate a flow rate $D_H$ of the first gas between a zero value and a maximum value $D_{H,max}$;

at least one second chamber through which a second gas is able to flow;

a seal-tight enclosure in which the first and second chambers are housed, and through which the same second gas is able to flow, the enclosure being able to operate under a pressure of the second gas up to the maximum operating pressure $P_{max}$;

at least one second supply line that is able to supply the seal-tight enclosure and an inlet of the second chamber with the second gas, the second supply line comprising a second flow-rate regulator that is able to regulate a flow rate $D_O$ of the second gas between a zero value and a maximum value $D_{O,max}$;

at least one outlet line that is able to exhaust the second gas from inside the seal-tight enclosure, said outlet line comprising a third flow-rate regulator that is able to regulate a flow rate $D_{purge}$, of the second gas between a zero value and a maximum value $D_{purge,max}$;

pressure sensors ($P_H$, $P_O$) that are able to measure a pressure in each of the first and second chambers, between atmospheric pressure and the value of the maximum pressure $P_{max}$;

at least two regulating valves ($V_H$, $V_O$) that are arranged outside the enclosure and on outlet lines of the one or more first chambers and of the one or more second chambers, respectively, each valve being able to operate each at a temperature above a condensation temperature of the wet gas at the maximum pressure $P_{max}$ in question, each valve being able to be open from 0% to 100% and having a capacity $K_v$ suitable for the maximum pressure $P_{max}$ and for an average flow rate of the gas in question in each of the two outlet lines;

means for heating the lines containing the wet gas to a temperature above the condensation temperature of this wet gas at the maximum pressure $P_{max}$ in question; and commanding and automatically controlling means for commanding and automatically controlling the regulating valves ($V_H$, $V_O$) depending on differences in pressure values measured by the pressure sensors so as to obtain a minimum pressure difference between the one or more first chambers and the one or more second chambers.

2. The system as claimed in claim 1, comprising a condenser for condensing the wet gas, said condenser being arranged downstream of the regulating valve $V_H$ on the outlet line of the one or more first chambers.

3. The system as claimed in claim 1, the commanding and automatically controlling means furthermore being able to command and automatically control the regulators regulating the flow rate $D_O$ of the second gas depending on the state of openness of the valves $V_O$ for regulating the second gas, in order to prevent states of complete openness or closedness of the valves $V_O$ for the second gas.

4. The system as claimed in claim 1, comprising a high-temperature electrolysis or co-electrolysis (HTE) reactor comprising a stack of elementary solid-oxide (co-)electrolysis cells each comprising an anode, a cathode, and an electrolyte inserted between the anode and the cathode, the cells being electrically connected in series, the stack comprising two electrical terminals for a supply of current to the cells and defining flow chambers for, with respect to the first chambers, a flow of steam and hydrogen or of steam, hydrogen and carbon dioxide ($CO_2$) over the cathodes and flow chambers for, with respect to the second chambers, a flow of air or nitrogen or oxygen or of a mixture of gases containing oxygen over the anodes.

5. The system as claimed in claim 1, comprising a high-temperature fuel-cell (SOFC) stack comprising a stack of elementary solid-oxide electrochemical cells each comprising an anode, a cathode, and an electrolyte inserted between the anode and the cathode, the cells being electrically connected in series, the stack comprising two electrical terminals for a collection of current from the cells and defining flow chambers for, with respect to the first chambers, a flow of dihydrogen or another fuel gas or of a mixture containing a fuel gas over the anodes and flow chambers for, with respect to the second chambers, a flow of air or nitrogen or oxygen or of a mixture of gases containing oxygen over the cathodes.

6. The system as claimed in claim 1, wherein the pressure sensors are at least two absolute pressure sensors ($P_H$, $P_O$) that are each able to measure an absolute pressure in each of the first chambers and in each of the second chambers, respectively.

7. The system as claimed in claim 1, wherein the one or more pressure sensors ($P_H$) are one or more absolute pressure sensors $P_H$ that are each able to measure an absolute pressure in each of the first chambers, and comprising one or more differential pressure sensors that are able to measure a pressure difference $\Delta P_O = (P_O - P_H)$ between the one or more second chambers and the one or more first chambers, respectively.

8. The system as claimed in claim 1, furthermore comprising bypass valves $V_{H,bypass}$, $V_{O,bypass}$ that are each arranged in parallel with the regulating valves $V_H$, $V_O$, respectively.

9. A method for operating the system as claimed in claim 1, comprising:

a/ defining the following operating setpoints:
  a1/ defining a flow rate $D_H$ that corresponds to an amount of potentially wet gas required for a preset electrochemical operating point;
  a2/ defining a flow rate $D_O$ that corresponds to an amount of second gas required for the preset electrochemical operating point and to purge the seal-tight enclosure;
  a3/ defining a flow rate $D_{purge}$ that corresponds to an amount of second gas required to ensure detection of and safety with respect to leaks and to avoid a formation of an explosive atmosphere in the enclosure;
  a4/ defining a pressure $P_{setpoint}$ for the preset operating point;
  a5/ defining a differential pressure $\Delta P_{O,setpoint}$ corresponding to a pressure difference between the pressure in the one or more second chambers and in the seal-tight enclosure, and the pressure in the one or more first chambers;

b/ applying the following regulations:
  b1/ actuating the regulator(s) for regulating the flow rate of the first wet gas, in order to regulate the flow rate $D_H$ of the first wet gas;
  b2/ actuating the regulator(s) for regulating the flow rate of the second gas, in order to regulate the flow rate $D_O$ entering into the one or more second chambers and into the enclosure;
  b3/ actuating the regulator(s) for regulating the flow rate of purge gas, in order to regulate the flow rate $D_{purge}$ of second gas exiting from the enclosure;
  b4/ actuating the valve $V_H$ for regulating the first wet gas in order to regulate the actual pressure $P_H$ of the one or more first chambers to the setpoint value $P_{setpoint}$; and
  b5/ actuating the valve $V_O$ of the second gas so that the actual differential pressure $\Delta P_O = (P_O - P_H)$ between, on the one hand, the one or more second chambers and in the enclosure and, on the other hand, the one or more first chambers, is regulated depending on a measured error ($\Delta P_{O,setpoint} - \Delta P_O$) with respect to the setpoint, so that the pressure $P_O$ of the second gas follows that $P_H$ of the one or more first chambers with the setpoint differential pressure $\Delta P_{O,setpoint}$.

10. The operating method as claimed in claim 9, further comprising:

increasing the flow rate $D_O$ of the second gas if the valve $V_O$ for regulating the second gas is close to a state of complete closedness.

11. The operating method as claimed in claim 9, further comprising:

decreasing the flow rate $D_O$ of the second gas if the valve $V_O$ for regulating the second gas is close to a state of complete openness.

12. The system as claimed in claim 1, wherein the second gas is air.

* * * * *